US009031535B2

(12) United States Patent
Wass

(10) Patent No.: US 9,031,535 B2
(45) Date of Patent: *May 12, 2015

(54) UN-CIPHERED NETWORK OPERATION SOLUTION

(71) Applicant: Telefonaktiebolaget L M Ericsson (publ), Stockholm (SE)

(72) Inventor: Mikael Wass, Hyssna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/144,959

(22) Filed: Dec. 31, 2013

(65) Prior Publication Data

US 2014/0205096 A1   Jul. 24, 2014

Related U.S. Application Data

(63) Continuation of application No. 13/201,500, filed as application No. PCT/EP2010/051105 on Jan. 29, 2010, now Pat. No. 8,626,122.

(60) Provisional application No. 61/152,817, filed on Feb. 16, 2009.

(51) Int. Cl.
*H04W 4/00* (2009.01)
*H04B 1/00* (2006.01)
*H04W 12/08* (2009.01)
*H04L 29/06* (2006.01)
*H04W 12/02* (2009.01)

(52) U.S. Cl.
CPC ............ *H04W 12/08* (2013.01); *H04L 63/12* (2013.01); *H04W 12/02* (2013.01)

(58) Field of Classification Search
CPC ..... H04W 24/10; H04W 12/04; H04W 12/08; H04W 88/08; H04W 88/16; H04W 12/02; H04W 12/06; H04W 12/12; H04W 24/04; H04W 28/0289; H04W 36/0038; H04W 36/0072; H04W 36/14; H04W 36/165; H04W 36/38

USPC .............. 455/419–411, 435.1, 436, 522, 410, 455/456.1, 438, 452.2; 370/272, 230, 255, 370/328, 329, 331, 401, 235, 252, 394, 225, 370/226, 228, 229, 232, 242, 254, 312

See application file for complete search history.

(56) References Cited

U.S. PATENT DOCUMENTS 6,819,937 B2    11/2004   Knuutila et al. ............... 455/522
8,626,122 B2 *  1/2014    Wass ............................. 455/410

(Continued)

FOREIGN PATENT DOCUMENTS

CN      101310473 A      11/2008
WO      2007053302 A2     5/2007

(Continued)

OTHER PUBLICATIONS

3GPP, "3rd Generation Partnership Project; Technical Specification Group Services and System Aspects; 3GPP System Architecture Evolution (SAE); Security Architecture (Release 8)", 3GPP TS 33.401 ver. 8.2.1, Dec. 19, 2008, pp. 1-58; XP002574135.

(Continued)

*Primary Examiner* — Inder Mehra
(74) *Attorney, Agent, or Firm* — Rothwell, Figg, Ernst & Manbeck, P.C.

(57) ABSTRACT

The present invention relates to a solution for handling security issues of non access stratum (NAS) signaling in a telecommunications network. The NAS signaling is performed between a user equipment (UE) and a mobility management node, e.g. a mobility management entity (MME). The solution is realized in a device and in a method comprising steps of receiving an initial non access stratum message from the UE communicating wirelessly with the telecommunications network, determining security context status for the UE, determining if unciphered mode is to be used in the security context, set ciphering algorithm to a null ciphering algorithm, transmitting a security context and activation message to the UE, comprising information indicating ciphering algorithm, and receiving a security context activation acknowledge message from the UE.

18 Claims, 5 Drawing Sheets

(56) References Cited

U.S. PATENT DOCUMENTS

| | | | |
|---|---|---|---|
| 2004/0083360 A1 | 4/2004 | Walsh et al. | |
| 2007/0101120 A1 | 5/2007 | Patel et al. | 713/151 |
| 2008/0305792 A1 | 12/2008 | Khetawat et al. | 455/435.1 |
| 2009/0061877 A1* | 3/2009 | Gallagher et al. | 455/436 |
| 2009/0305671 A1* | 12/2009 | Luft et al. | 455/411 |
| 2010/0250497 A1* | 9/2010 | Redlich et al. | 707/661 |
| 2010/0293372 A1 | 11/2010 | Fischer et al. | 713/168 |

FOREIGN PATENT DOCUMENTS

| | | |
|---|---|---|
| WO | 2008040412 A1 | 4/2008 |
| WO | 2009012281 A2 | 1/2009 |

OTHER PUBLICATIONS

3GPP, "3rd Generation Partnership Project; Technical Specification Group Core Network and Terminals; Non-Access-Stratum (NAS) Protocol for Evolved Packet System (EPS); Stage 3 (Release 8)", 3GPP TS 24.301 ver. 8.0.0, Dec. 1, 2008, pp. 1-110; XP002607004.

Office Action issued on Aug. 30, 2013 in corresponding Chinese Patent Application No. 201080008671.2, 2 pages (English translation only).

Office Action issued on Nov. 26, 2013 in corresponding Japanese Patent Application No. 2011-549510, 2 pages.

* cited by examiner

UN-CIPHERED NETWORK OPERATION SOLUTION

CROSS-REFERENCE TO RELATED APPLICATIONS

This application is a continuation of U.S. patent application Ser. No. 13/201,500 (now U.S. Pat. No. 8,626,122), which is a 35 U.S.C. 371 National Phase Entry Application from PCT/EP2010/051105, filed Jan. 29, 2010 (published as WO 2010/091966), which designated the U.S. and claims priority to U.S. provisional patent application No. 61/152,817, filed Feb. 16, 2009. Each of the above identified applications and publications is incorporated by reference.

TECHNICAL FIELD

The present invention relates to a solution for handling security issues of non access stratum signaling in a telecommunications network.

BACKGROUND

The NAS protocol used for UE/MME interaction has a security protection mechanism comprising integrity protection and/or ciphering of messages. In normal ciphered operation all messages shall be ciphered as soon as a security context has been activated for a specific NAS connection.

It is also specified in 3GPP TS 24.301 that ciphering is an operator option. Thus SAE needs to support un-ciphered operation in the NAS protocol.

Different methods to solve un-ciphered operation may be selected and one way is to always use non security protected NAS messages. There are two general types of NAS messages, plain NAS messages that have no security protection and security protected NAS messages that have integrity protection and/or ciphering applied.

If there is no common way to solve un-ciphered operation mode in SAE there will be interoperability problems between UE and MME and between different vendors, effectively making un-ciphered operation impossible.

If a method is chosen where non security protected NAS messages are used for all messages in un-ciphered operation mode, it implies that the MME implementations will be more complicated and needs to be able to distinguish between ciphered and un-ciphered operation for most NAS messages.

Furthermore, if using plain NAS messages in un-ciphered operation, integrity protection of the NAS messages will not be available and exceptions to those rules would also have to be implemented.

SUMMARY

It is therefore an object of the present invention to address these problems and to provide a solution for interoperability of NAS security.

The concept of the present invention is to select a "null ciphering algorithm" when a security context is selected for use by a mobility management device, e.g. a Mobility Management Entity (MME) operating in un-ciphered mode. This may be done for all UEs using the network in un-ciphered operation or for individual UEs in connection with the MME. In all other aspects the NAS messages may be sent, received, and treated in the same way as in a network in normal ciphered operation.

This is provided in a number of aspects of the present invention, in which a first is a method for handling security issues in an infrastructure node in a telecommunications network. The method comprising the steps of: a) Receiving an initial non access stratum, i.e. NAS, message from a user equipment (UE) communicating wirelessly with the telecommunications network; b) Determining security context status for the UE; c) Determining if un-ciphered mode is to be used in the security context; d) Set ciphering algorithm to a null ciphering algorithm; e) Transmitting a security context and activation message to the UE, comprising information indicating ciphering algorithm; and f) Receiving a security context activation acknowledge message from UE.

All security contexts may be created with a null ciphering algorithm and/or security context for individual UEs may be set to a null ciphering algorithm.

The method may further comprise steps of receiving further NAS messages and deciphering the further NAS messages using the null ciphering algorithm. Furthermore, the method may also comprise a step of providing integrity protection of communication messages. Messages may be treated as being in normal ciphered mode independent on ciphering mode.

The null ciphering algorithm is preferably arranged so as to operate on messages in such a way that the messages are un-altered.

The step of transmitting security context may include indicating in a field in a message one of no integrity protection and no ciphering, integrity protection only, or integrity protection and ciphering on.

Another aspect of the present invention is provided, an infrastructure device in a telecommunications network. The device comprising a processing unit, a memory unit, and a communication interface unit. The processing unit may be configured to execute instructions sets stored in the memory unit for receiving using the communication interface an initial non access stratum, i.e. NAS, message from a user equipment, determining security context status, creating a new security context, determining if un-ciphered mode is to be used in the security context, set ciphering algorithm to null, transmitting, using the communication interface, a security context and activation message to the UE, comprising information indicating ciphering algorithm, and receiving, using the communication interface, a security context activation acknowledge message from UE.

The infrastructure device may be a mobility management device, e.g. a mobility management entity (MME).

With the solution according to the present invention the following advantages may be realized: the criteria for accepting a particular NAS message may be the same in ciphered and un-ciphered operation; the integrity protection part of security protection may still be active in un-ciphered operation; and the solution may be entirely implemented in the MME—i.e. no UE impact; which thus provides a cost efficient implementation of the present invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
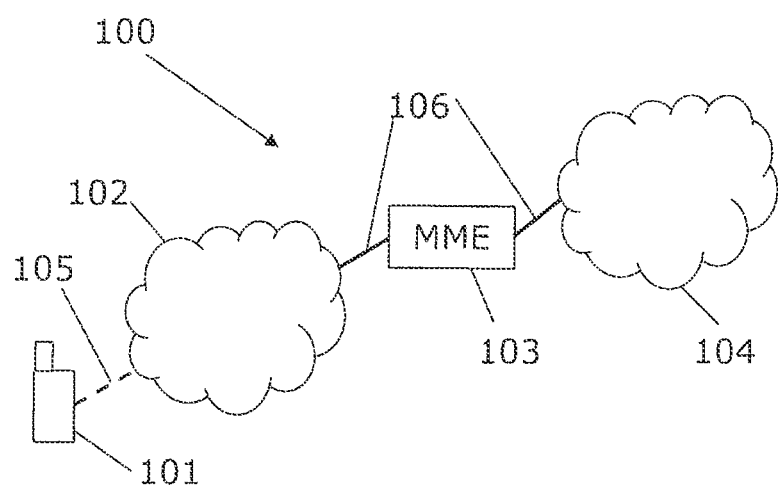
FIG. 1 illustrates schematically a network according to the present invention.

In FIG. 1, reference numeral 100 generally denote a telecommunications network comprising a radio access network 102 in connection 106 with a mobility management device 103, e.g. a mobility management entity (MME), which is part of a core network 104. The radio access network provides access to the telecommunications network for user equipment 101 (UE) connecting wirelessly 105 to the radio access network, for instance via a base station (not shown), e.g. an eNodeB or similar network access node. For illustrative purposes the MME will be used in the description but it should be noted that other mobility management devices may be applicable. The network may comprise further nodes; however, these are not shown since they do not form part of the present invention, for instance a serving gateway, a packet data network gateway, a home subscriber server, and so on. Furthermore, the network also comprises communication distribution devices such as routers, switches, and cabling for physical distribution of communication data.

The UE attaches to the network using normal attachment procedures depending on protocol standard in use, e.g. LTE, SAE, or similar packet based protocols. During attachment to the network the UE is to establish a non access stratum connection to the core network 104. This is initiated by the UE which sends a request for establishment to the core network and to the MME.

When a new NAS connection is established between the UE and the MME a security context shall be taken into use and this is negotiated between the UE and the MME. If the MME has been configured not to apply ciphering for NAS messages the MME selects a "null ciphering algorithm" to be used by the security context. Apart from this exception the MME may handle all procedures and NAS messages between the UE and the MME as if the network was operating in normal ciphered mode, i.e. the same rules apply when a particular NAS message shall be marked as "plain" or "security protected".

The null ciphering algorithm may comprise an algorithm that does not change the data during encryption. This may be defined in the algorithm itself or by the use of key set identifiers used in seeding the algorithm making the algorithm perform as not changing the data during encryption.

Normal authentication procedures may be executed, for instance for integrity protection of data transmitted. This allows for integrity protection of data together with null ciphering of data.

Figure 2A:
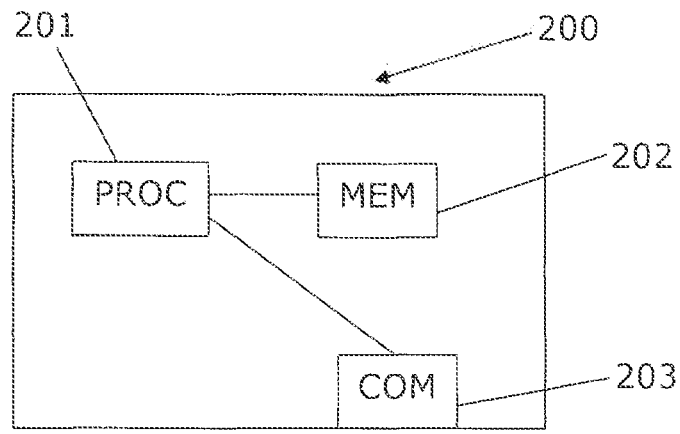
FIGS. 2A and 2B illustrate schematically a device according to the present invention.

The solution according to the present invention is advantageously implemented in the mobility management device, e.g. the MME. The MME 103, 200 may comprise, as is seen in FIG. 2A, at least one processing unit 201, at least one computer readable storage medium, e.g. a memory unit, 202, and at least one communication interface 203. The processing unit is configured to read software or hardware instruction sets from the memory unit and together with the communication interface execute methods according to the present invention. The processing unit may comprise any suitable processing device such as for instance a microprocessor, central processing unit (CPU), digital signal processor (DSP), application specific integrated circuit (ASIC), or field programmable gate array (FPGA). It should be noted that the instruction sets may also comprise hardware instructions as usually implemented for ASIC solutions. Furthermore, the memory unit may comprise a volatile or non-volatile memory type or a combination of these types. The communication interface is preferably configured to communicate in a packet based manner, e.g. through protocols such as Internet Protocol (IP) based protocols.

Figure 2B:
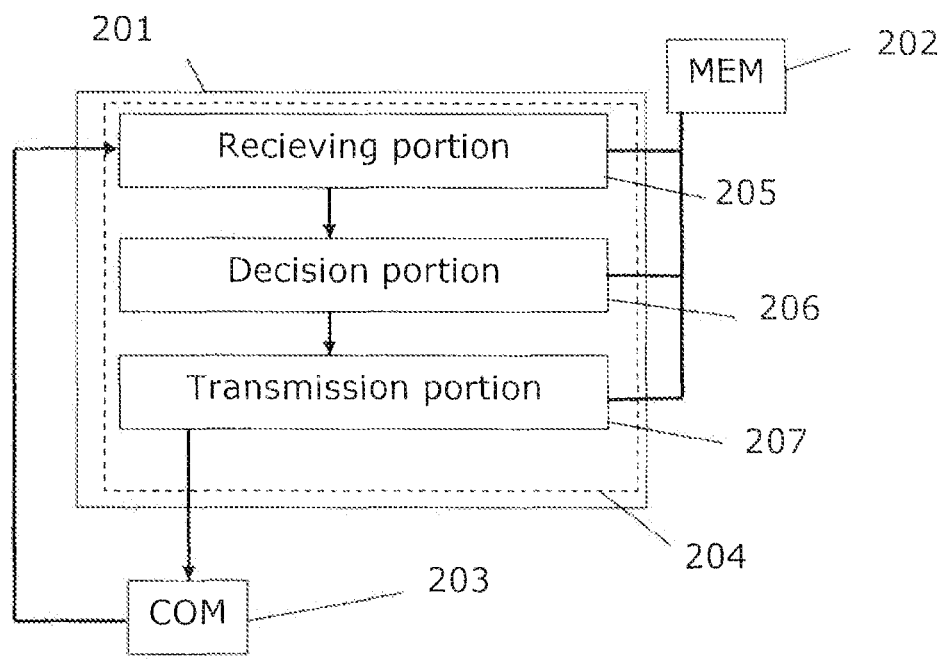

Functional elements of the MME is shown in FIG. 2B where the processor has a receiving portion for receiving communication data from the communication interface, a decision portion for executing software commands for handling decisions related to the operation of the MME and in particular of handling decision related to the security context as will be described below in more detail. The processor also has a transmitting portion configured to transmit messages via the communication interface. All portions of the processor may use the memory unit for temporary storage of data and/or for permanent storage of data depending on configuration of the node.

During operation the MME will communicate with the UE and with other devices for operation of network related provisions. For instance as will be discussed below, the MME participates in establishment procedures when a UE attaches to a network; for instance at initial connection or during hand over from another network.

Figure 3A:
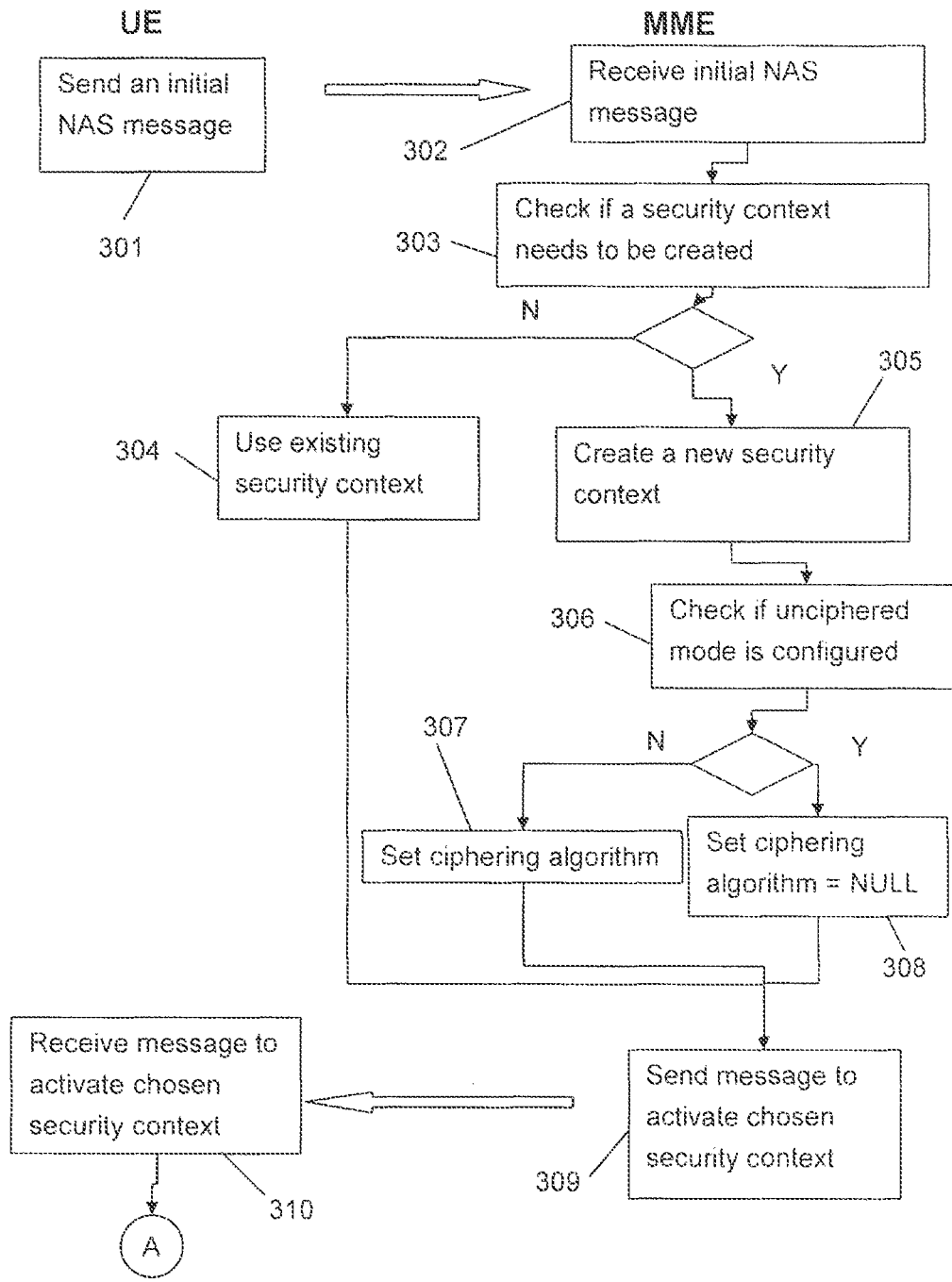
FIGS. 3A and 3B illustrate a method according to the present invention.
Figure 3B:
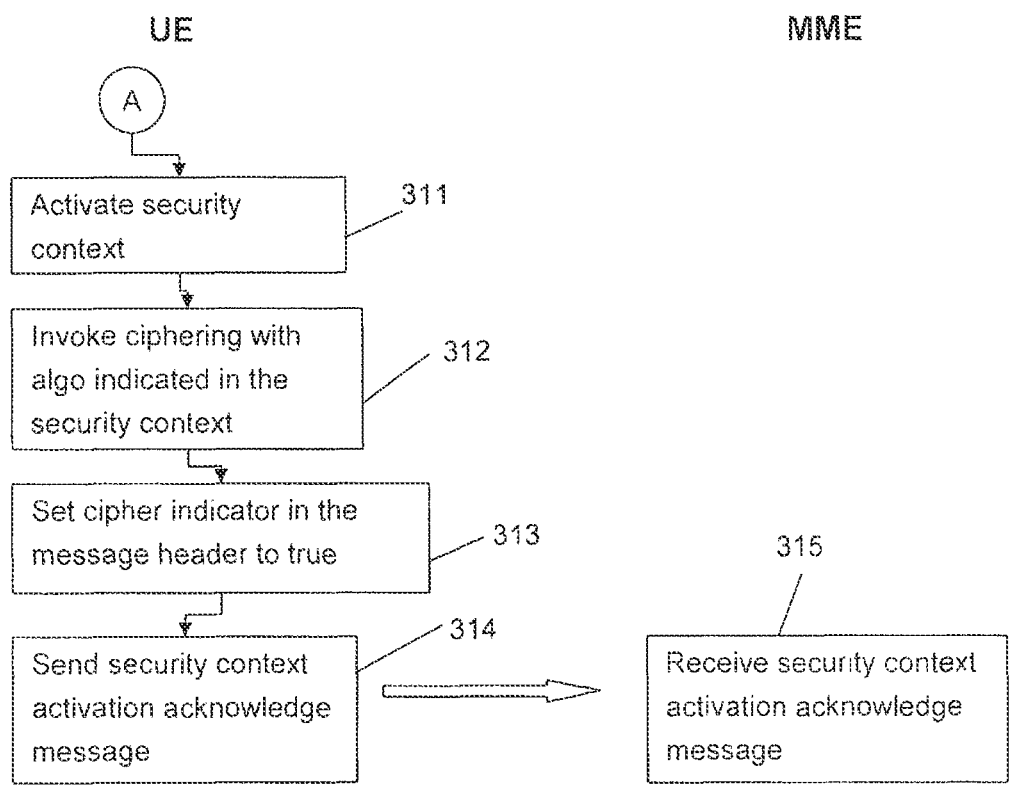

FIG. 3A and FIG. 3B together illustrate an example of initial NAS establishment procedure. The UE first initiates the establishment by transmitting 301 an initial NAS message requesting establishment which is received 302 by the MME. In the next step, the MME checks 303 if a security context needs to be created. Depending on if a security context is to be created or not different paths will be executed. If no new security context need to be created it is decided 304 to use an existing security context and the security context is transmitted 309 to the UE; however, if a security is to be created, it is created 305. Furthermore, the MME checks 306 if un-ciphered mode is to be used; if an un-ciphered mode is used, the ciphering algorithm is set to null 308; otherwise the ciphering algorithm is set 307 as chosen. A message is sent 309 to activate the chosen security context and this is received 310 by the UE.

The UE activates 311 the security context and invokes 312 the ciphering algorithm indicated in the security message. The UE sets 313 the ciphering indicator in an acknowledge message header to true and transmits 314 the activation acknowledge message to the MME which receives 315 the security context activation acknowledge message.

Figure 4:
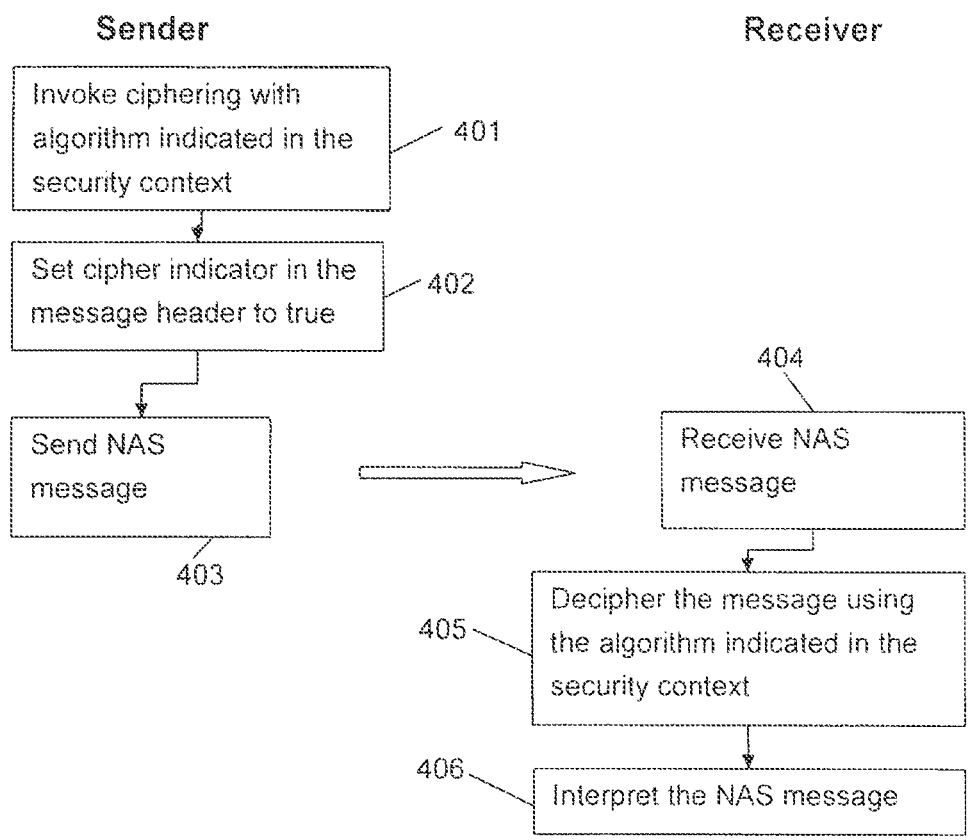
FIG. 4 illustrates schematically in a block diagram another method according to the present invention.

FIG. 4 illustrates a continued action of a communication link between a sender, e.g. the UE, and a Receiver, e.g. the MME, when the initial NAS establishment procedure has been executed. The UE invokes 401 the ciphering algorithm indicated in the security context and sets 402 a ciphering indicator in a message header to true. The UE then sends 403 the message which is received 404 by the MME. The MME decipher 405 the message using the ciphering algorithm indicated in the security context and finally interpret 406 the message accordingly. It should be appreciated that the communication may be performed in any direction and that other nodes may be involved in NAS communication with the UE then the MME.

It should be noted that the selection of un-ciphered mode may be done at any time, not only when creating a security context. If un-ciphered mode is selected at a certain point in time also the already attached UE's may get the selected ciphering algorithm changed to null. Also the un-chiphered mode may be turned off at any time by selecting a "normal" ciphering algorithm. Changing the ciphered mode may be used for instance for tests of UE connection to the infrastructure network or tests of the UE condition.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

EPS—Evolved Packet System
LTE—Long Term Evolution
MME—Mobility Management Entity
NAS—Non Access Stratum
SAE—System Architecture Evolution
UE—User Equipment

REFERENCES

[1] 3GPP TS 33.401: "3GPP System Architecture Evolution; Security architecture".
[2] 3GPP TS 24.301: "Non-Access-Stratum (NAS) protocol for Evolved Packet System (EPS); Stage 3".

The invention claimed is:

1. A method for handling security issues in an infrastructure node in a telecommunications network, the method comprising:
   storing, at the infrastructure node, a configuration parameter for use in selecting a ciphering algorithm from a set of predefined ciphering algorithms;
   receiving, at the infrastructure node, an initial non access stratum (NAS) message from a user equipment (UE) communicating wirelessly with the telecommunications network;
   after receiving the initial NAS message, determining that a security context needs to be created;
   in response to determining that a security context needs to be created, i) selecting a ciphering algorithm from said set of predefined ciphering algorithms based on said configuration parameter stored at the infrastructure node, wherein the selected ciphering algorithm is a Null ciphering algorithm and ii) after selecting the Null ciphering algorithm, transmitting to the UE a security command message comprising a ciphering algorithm identifier identifying the selected ciphering algorithm; and
   receiving from the UE a security context activation acknowledge message.

2. The method of claim 1, wherein the configuration parameter indicates that unciphered mode has been configured.

3. The method of claim 1, wherein selecting the ciphering algorithm from said set of predefined ciphering algorithms comprises selecting a ciphering algorithm identifier from a set of predefined ciphering algorithm identifiers stored in the infrastructure node.

4. The method of claim 1, further comprising
   after receiving the acknowledgement message, receiving, at the infrastructure node, a second NAS message transmitted by the UE, the second NAS message comprising a message header containing information identifying the second NAS message as a security protected NAS message; and
   in response to receiving the second NAS message, the infrastructure node deciphering the second NAS message using the selected ciphering algorithm.

5. The method of claim 4, wherein deciphering the second NAS message using the selected ciphering algorithm comprises the infrastructure node generating an encryption key stream using the selected ciphering algorithm, wherein the generated encryption key stream is all zeros.

6. The method of claim 1, wherein the configuration parameter is associated with the UE.

7. The method of claim 1, further comprising:
   receiving additional NAS messages; and
   deciphering the additional NAS messages using the null ciphering algorithm indicated in the security context.

8. The method of claim 1, further comprising integrity protecting the security command message.

9. The method of claim 1, wherein the selected ciphering algorithm is used to generate an encryption key stream.

10. The method of claim 1, wherein the infrastructure node is a mobility management entity (MME).

11. An infrastructure device in a telecommunications network, comprising:
    a data storage unit storing a configuration parameter for use in selecting a ciphering algorithm from a set of predefined ciphering algorithms;
    a communication interface for receiving an initial non access stratum (NAS) message transmitted by a user equipment (UE); and
    data processing circuitry configured to:
    determine that a security context needs to be created after the communication interface receives the initial NAS message, and
    in response to determining that a security context needs to be created, i) select a ciphering algorithm from said set of predefined ciphering algorithms based on said stored configuration parameter, wherein the selected ciphering algorithm is a Null ciphering algorithm and ii) transmit to the UE a security command message comprising a ciphering algorithm identifier identifying the selected ciphering algorithm.

12. The infrastructure device of claim 11, wherein the configuration parameter indicates that unciphered mode has been configured.

13. The infrastructure device of claim 11, wherein the processing circuitry is configured to select the ciphering algorithm from said set of predefined ciphering algorithms by selecting a ciphering algorithm identifier from a set of predefined ciphering algorithm identifiers stored in the data storage unit.

14. The infrastructure device of claim 11, wherein the processing circuitry is further configured such that, after the communication interface receives from the UE a second NAS message comprising a message header containing information identifying the second NAS message as a security protected NAS message, the processing circuitry deciphers the second NAS message using the selected ciphering algorithm.

15. The infrastructure device of claim 14, wherein the processing circuitry is configured to decipher the second NAS message using the selected ciphering algorithm by generating an encryption key stream using the selected ciphering algorithm, wherein the generated encryption key stream is all zeros.

16. The infrastructure device of claim 11, wherein the configuration parameter is associated with the UE.

17. The infrastructure device of claim 11, wherein the processing circuitry is further configured to integrity protect the security command message.

18. The infrastructure device of claim 11, wherein the infrastructure device is a mobility management entity (MME).

* * * * *

UNITED STATES PATENT AND TRADEMARK OFFICE
CERTIFICATE OF CORRECTION

| | | |
|---|---|---|
| PATENT NO. | : 9,031,535 B2 | Page 1 of 1 |
| APPLICATION NO. | : 14/144959 | |
| DATED | : May 12, 2015 | |
| INVENTOR(S) | : Wass | |

It is certified that error appears in the above-identified patent and that said Letters Patent is hereby corrected as shown below:

In the Drawings

In Fig. 2B, Sheet 2 of 5, for Tag "205", in Line 1, delete "Recieving" and insert -- Receiving --, therefor.

In the Claims

In Column 5, Line 65, in Claim 4, delete "comprising" and insert -- comprising: --, therefor.

Signed and Sealed this
First Day of March, 2016

Michelle K. Lee
*Director of the United States Patent and Trademark Office*